Sept. 15, 1931. J. R. REPLOGLE 1,823,002
REFRIGERATING UNIT
Filed June 6, 1921 10 Sheets-Sheet 1

Sept. 15, 1931.  J. R. REPLOGLE  1,823,002
REFRIGERATING UNIT
Filed June 6, 1921  10 Sheets-Sheet 2

Sept. 15, 1931. J. R. REPLOGLE 1,823,002
REFRIGERATING UNIT
Filed June 6, 1921 10 Sheets-Sheet 5

Sept. 15, 1931. J. R. REPLOGLE 1,823,002
REFRIGERATING UNIT
Filed June 6, 1921 10 Sheets-Sheet 6

Witness:
Inventor
John R. Replogle
By his Attorneys

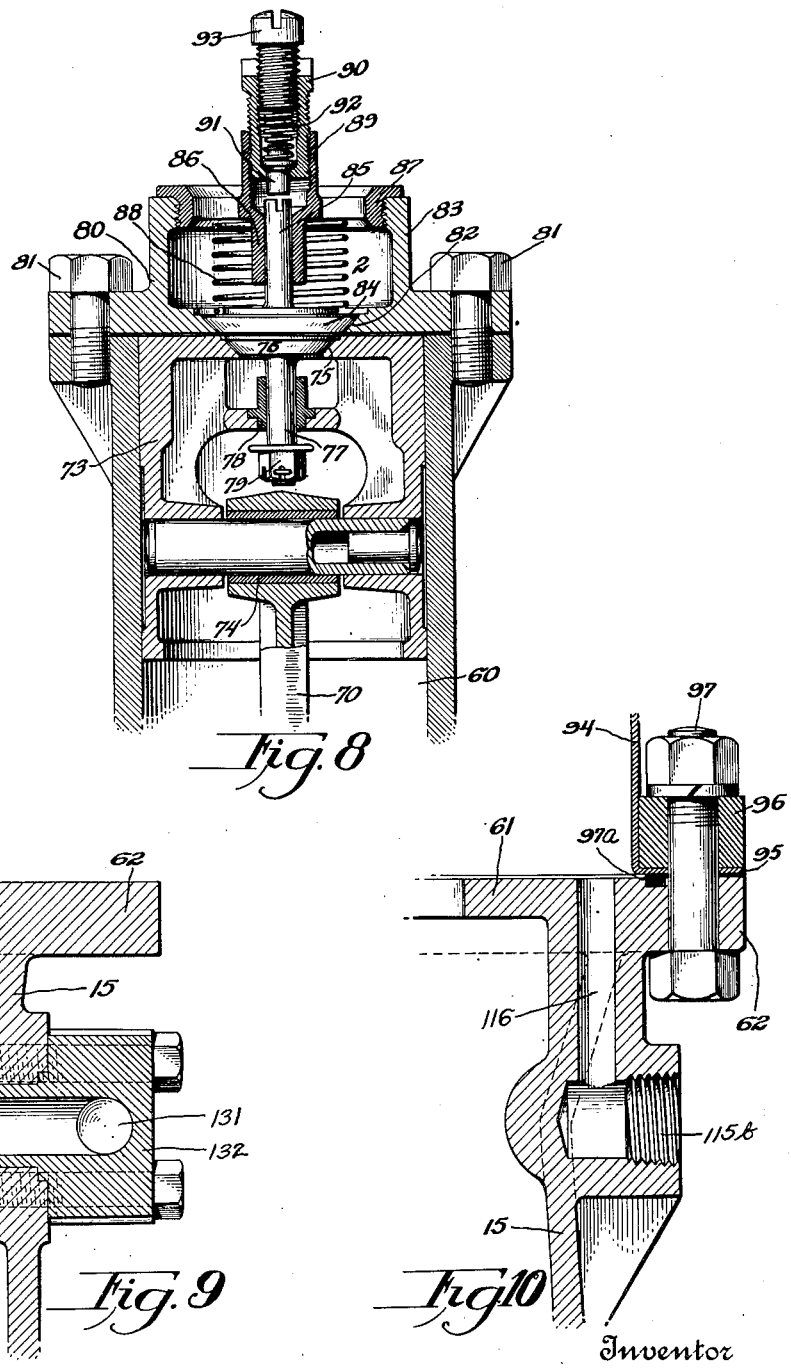

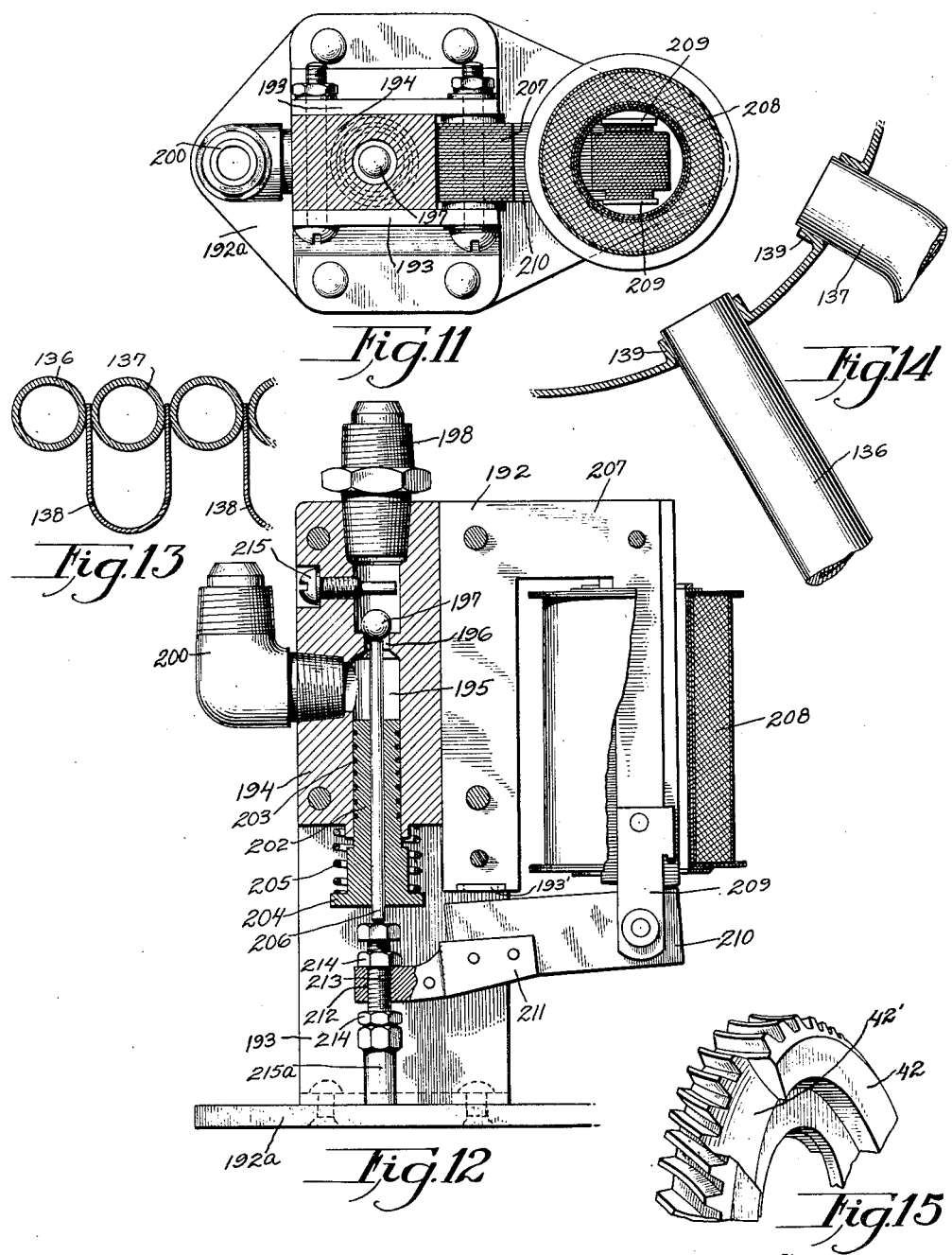

Sept. 15, 1931.   J. R. REPLOGLE   1,823,002
REFRIGERATING UNIT
Filed June 6, 1921   10 Sheets-Sheet 9
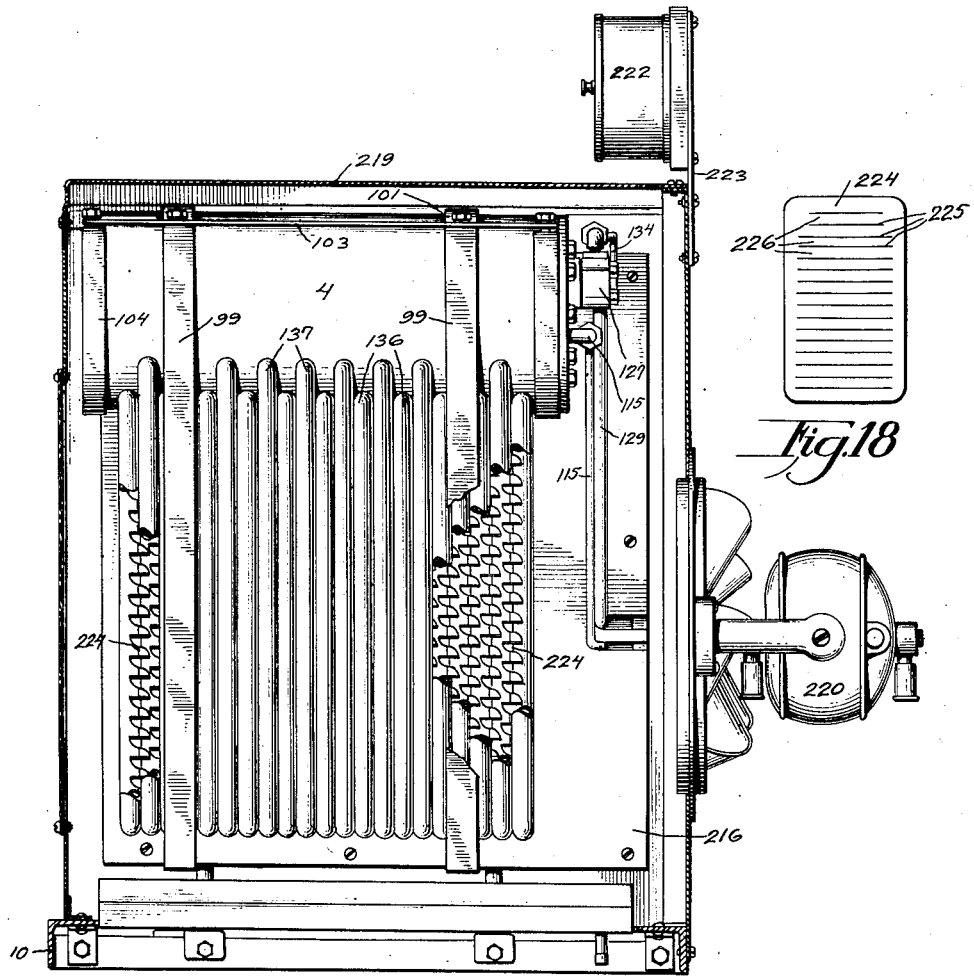
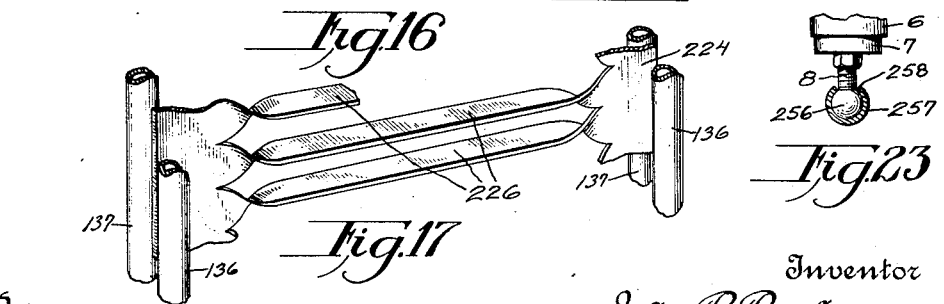

Sept. 15, 1931.  J. R. REPLOGLE  1,823,002
REFRIGERATING UNIT
Filed June 6, 1921    10 Sheets—Sheet 10
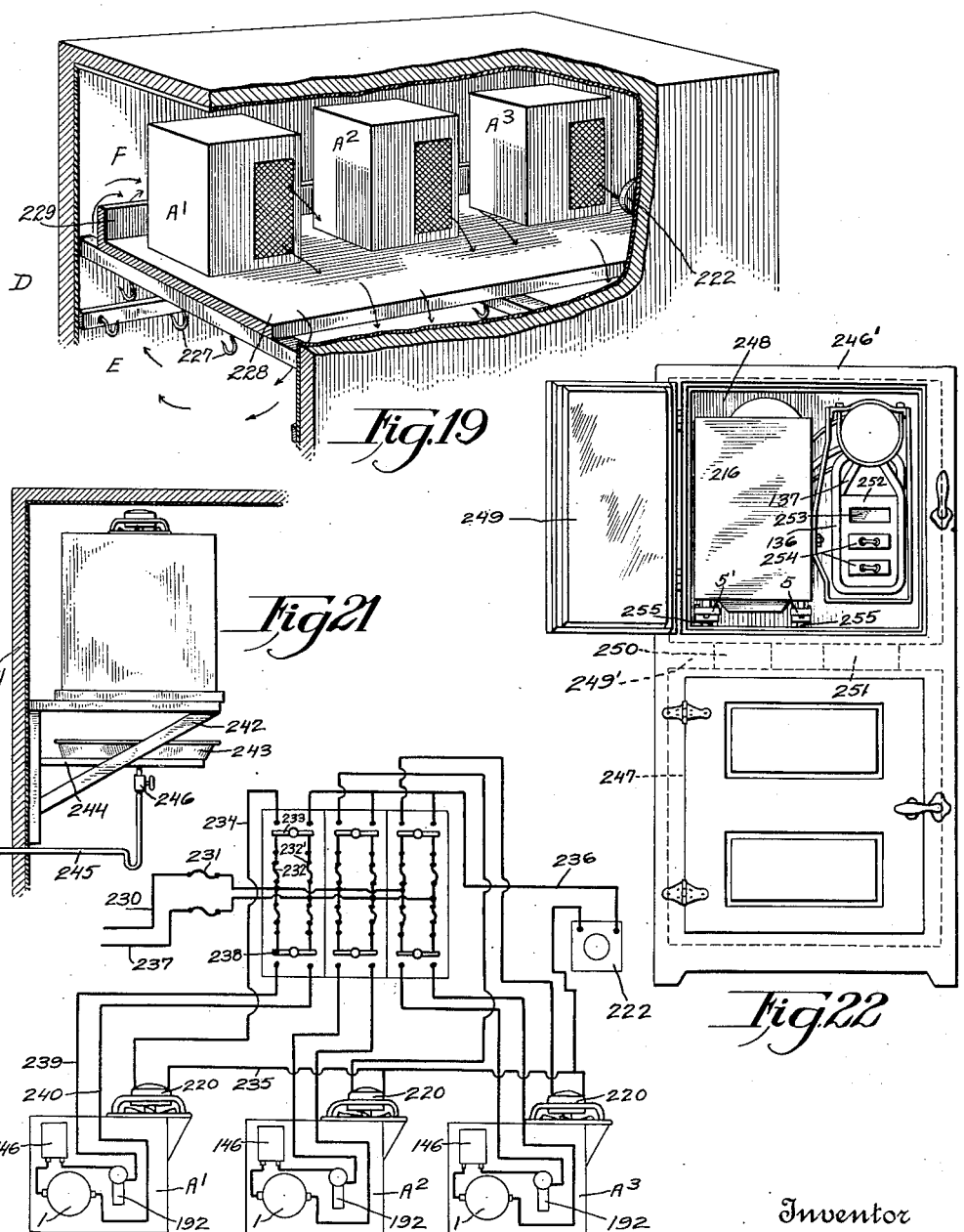

Patented Sept. 15, 1931

1,823,002

UNITED STATES PATENT OFFICE

JOHN R. REPLOGLE, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN

REFRIGERATING UNIT

Application filed June 6, 1921. Serial No. 475,344.

This invention relates to refrigerating or cooling devices that are automatically operated and controlled.

One object of the invention is the provision of mechanical refrigeration apparatus having improved means for controlling the operation of the compressor.

Another object of the invention is the provision of refrigeration apparatus comprising a motor-driven compressor, a condenser and a vaporizer and having improved means for controlling both the compressor motor and the flow of condenser water.

Another object of the invention is the provision of a highly compact motor-compressor-condenser unit for refrigeration apparatus.

Another object of the invention is to provide a highly efficient automatic apparatus for cooling the air of cold storage rooms or other spaces.

A further object of the invention is the production of a new and improved, compact, portable refrigerating or cooling unit that is adapted to be installed, as a unitary structure, in enclosed spaces where it is desirable to maintain a comparatively cool temperature, such as in cold storage rooms of retail stores, meat shops, refrigerators and the like, as well as in spaces where it is desirable during the hot season of the year to maintain a comfortable temperature for the inmates thereof, such, for instance, as rooms in dwellings, hospitals, places of worship, business or amusement, etc.

Another object of the invention is the provision of a refrigerating or cooling unit that is so constructed and arranged that when in use in an enclosed space the air therein will be mechanically agitated, circulated, and thoroughly mixed at frequent intervals.

Other objects of the invention, some of them more or less ancillary or incidental to those above stated, will appear hereinafter as the description proceeds.

In the drawings:

Figure 8 is a section on line 8—8 of Figure 5;

Figure 9 is a section on line 9—9 of Figure 3;

Figure 10 is a section on line 10—10 of Figure 2;

Figure 11 is a plan view of the electrically controlled water valve;

Figure 12 is a side elevation thereof with parts in section;

Figure 13 is a section on line 13—13 of Figure 3;

Figure 14 is a section on the broken line 14—14 of Figure 4;

Figure 15 is a detail view of a portion of the worm gear;

Figure 16 is a side elevation of a modified form of the device with parts broken away;

Figure 17 is a detail view showing the attachment of the radiating fins;

Figure 18 is an elevational view of a blank from which the fins are formed;

Figure 19 is a perspective view, parts in section and parts broken away, of a conventional cooling room employed in retail shops or stores with a plurality of cooling units located therein.

Figure 20 is a wiring diagram for the units shown in Figure 19;

Figure 21 is a side elevation, parts in section and parts broken away of a cooling room with a cooling unit shown in position therein.

Figure 22 is a front elevation of a refrigerator with a cooling unit in position therein; and Figure 23 is a detail view of a modified form of mounting for the cooling unit.

Figure 1:
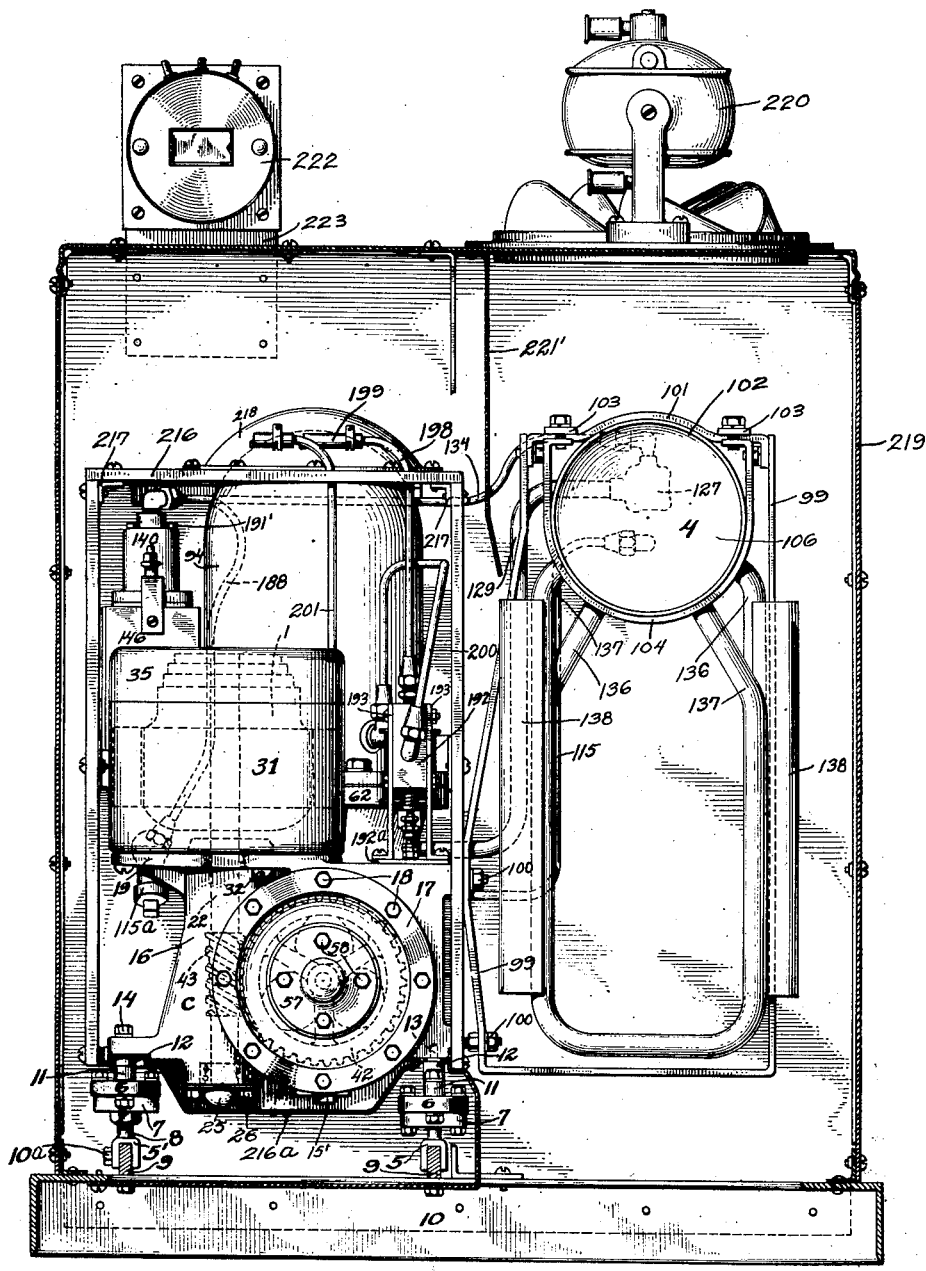
Figure 1 is a front elevation of the device, with parts in section.
Figure 2:
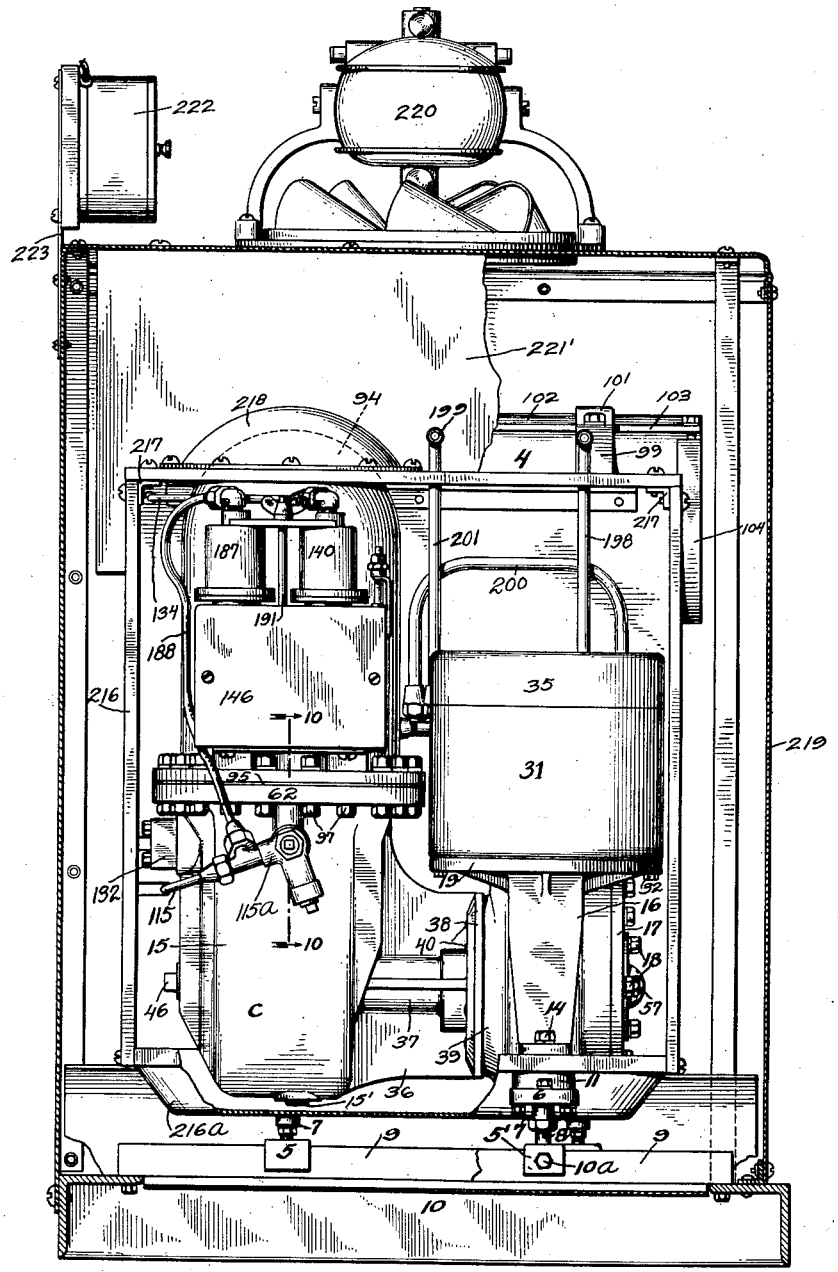
Figure 2 is a side elevation thereof with parts in section.

In cold storage rooms, and more especially in cold storage rooms of retail stores, meat shops, oyster houses and the like, ice has been commonly employed, heretofore, as the cooling agent or means for reducing and maintaining a comparatively low temperature therein. But ice as a cooling agent is unsatisfactory for various reasons. It is costly, troublesome, in efficient and unsanitary, and is also objectionable because of the large space and equipment necessary for its utilization. It is almost impossible to regulate the temperature of an enclosed space that is cooled by means of natural or artificial ice. Moreover, in extremely hot weather, it is not an infrequent occurence for all the ice in the ice receptacle to melt before it can be replenished, thus causing deterioration and loss of articles, that have been placed within the cooling or refrigerating space.

In large refrigerating space or rooms, it has been found to be less expensive and more satisfactory in every way to install machinery to mechanically maintain those spaces or rooms at the required low temperature. But, heretofore, such machinery has been too expensive in its original cost, and in its cost of installation and operation, to be employed in other than large rooms or spaces. Moreover, replacements and repairs in and for such devices require the presence and services of an expert.

These and other disadvantages are overcome by the device herein disclosed, which consists of a comparatively small portable unitary refrigerating unit, that may be installed by any ordinary workman and when installed it will automatically maintain the cooling room or enclosure at a predetermined low temperature without the services of an operator or attendant. This device is especially adapted for cooling rooms or enclosures of comparatively large dimensions. In other words, the device is primarily intended for the use of merchants and dealers engaged in the retail trade.

Referring more particularly to Figures 1 to 15, inclusive, the reference character A designates a cooling unit which consists of a refrigerant system B a motor 1 and attendant valves and control mechanism. The refrigerant system B consists essentially of the compressor 2, condenser 3, and vaporizer 4. Any suitable refrigerant may be employed in said system, such as sulphur dioxide ($SO_2$).

The base of the device is in the form of a housing C. The housing is provided with any suitable form of supports. In order, however, to reduce noise and vibration the housing is provided with flexible supports. As shown in Figures 1 to 5, there are two non-adjustable supports 5 on one side and an adjustable support 5' on the other. Each of these supports consists of a flexible member 6 to which a bottom cross-bar 7 is bolted. The cross-bar 7 is provided with a downwardly extending centrally arranged member 8 the lower end of which is bifurcated to engage a bar 9 secured edgewise to a suitable supporting frame 10. An upper cross-bar 11 arranged at right angles to the lower cross bar 7 is also bolted to the flexible member. The upper cross bar 11 is provided with an upwardly extending centrally arranged extension 12 which is reduced and screw-threaded to engage in a tapped hole in the housing, as shown at 13 at the right in Figure 1, or extends through an aperture in an extension on the housing C and is provided with a securing nut 14 as shown at the left of said figure. The member 8 on the left support, Fig. 1, is screwed into the cross member 7 and affords a means for raising and lowering the corresponding side of the housing to properly level the device. A lock nut holds the member 8 in adjusted position. This arrangement affords a convenient means for moving the unit onto the supporting frame 10 since the device may be slid along and withdrawn from or placed in position thereon with facility. A set screw 10a secures the supports in adjusted position.

The housing C consists of the crank case 15 and the gear case 16. The gear case 16 (see Fig. 5) has an enlarged opening in the front thereof for the insertion and removal of the gears. This opening is closed by the cover plate 17 secured in position by means of the bolts 18 engaging in tapped holes in the said gear case. The upper portion of the gear case 16 is provided at one side thereof with an annular flange 19 extending about an opening in which is mounted the anti-friction bearing 21 for the worm shaft 22. The lower end of the shaft 22 is provided with a step bearing 23 mounted in the lower end 24 of the casing 16. A cover plate 25 secured in position by means of the bolts 26 closes the lower end of the opening 24.

The motor 1 is a universal one having a vertical armature shaft 27. The shaft 27 is in the form of a sleeve and is removably mounted on the upwardly extended portion of the worm shaft 22. The two shafts are secured together by means of the slots 28 in the lower end of the sleeve or armature shaft 27 engaging the projecting ends of the pin 29 extending transversely through the shaft 22. A cap 20 held against the ends of the shafts 22 and 27 by the screw 30 secures the armature of the motor 1 against upward displacement. Thus, it will be seen, the armature shaft is mounted without bearing supports other than those of the worm shaft and they are disposed within the gear case where their lubrication is easily accomplished. Furthermore, the vertical arrangement of the motor shaft, in conjunction with the vertically arranged cylinder of the compressor presently to be described, reduces to a minimum the horizontal dimensions of the motor-compressor unit. The motor frame 31 containing the usual field windings, is secured to the flange 19 by means of the bolts 32. The upper open end of the motor frame 31 is closed by means of the removable cap, or cover 35. It will thus be seen that by removing the cap or cover 35 and the bolts 30 and 32 the motor may be removed. An oil deflector or slinger 33 mounted on the lower end of the hollow shaft 27 co-operates with the flange 34 to prevent oil from passing upward along the worm shaft 22 into the motor and its windings.

The crank case 15 is adapted to contain a suitable supply of oil for the lubrication of the compressor and for sealing the valves. The crank case 15 is provided with an opening in its lower end for the discharge of the oil from the case. This opening is closed by a plug 15' (see Fig. 5). In the operation of the compressor, the oil is splashed on the various journals and within the cylinder and some of it is scrubbed past the piston into the condenser where it is absorbed or dissolved in the refrigerant and carried therewith into the vaporizer.

The casing 15 is provided with a laterally extending web 36 which is provided with a drive shaft housing 37 terminating in an attaching flange 38. The flange 38 is counterbored to receive the apertured annular extension 39 on the casing or housing 16. The parts, and consequently the crank and gear cases 15 and 16 are secured together by means of the bolts 40.

Figure 5:
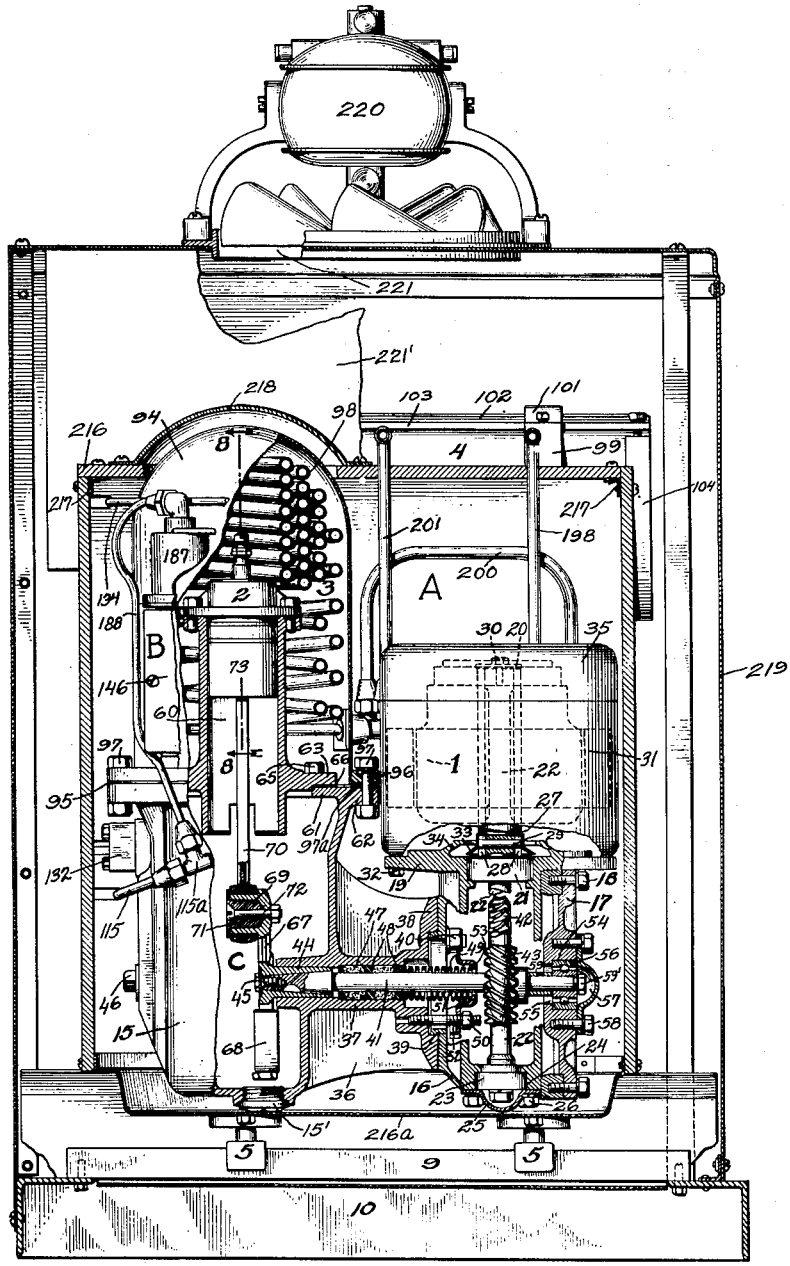
Figure 5 is a side elevation, similar to that shown in Figure 2, but with parts in section to show the internal operating mechanism of the device.

Extending through the drive shaft housing 37 is the drive shaft 41 on which is mounted the gear wheel 42 which is driven by the worm 43 on the shaft 22, shown in Fig. 5 with parts broken away to expose the gear wheel 42. The gear 42 has a segment from its rear side face removed as shown at 42' in Fig. 15, in order to permit the removal of the gear by a forward axial movement. The rear end of the shaft 41 is provided with the bearing 44 which is keyed thereto and secured in position thereon by means of the screw 45, access to which may be had through an oil receiving opening in the rear of the crank case 15, which is closed by the screw-threaded plug 46. The crank case may be supplied with oil through this opening. Suitable packing 47 is provided for preventing the oil and refrigerant from passing along the shaft 41 into the gear case. The packing is provided with the usual glands 48 against one of which the spring 49 engages. The tension of the spring 49 is regulated by means of nuts 50 on the studs 52 which engage the spring retaining member 51. The member 51 is provided with a depression 53 for engaging the front end of the spring. The front end of the shaft 41 extends into an opening 54 in the cover plate 17. The opening 54 is counterbored to provide a shoulder 55 against which the outer race of the bearing 56 is held by means of the cover plate 57 which closes the opening 54 and is held in position by any suitable means, as the screws 58. The inner race is clamped between a sleeve 59 and a nut 59' on the forward end of the shaft.

From the foregoing description, it will be apparent that by first removing the cap 57, the nut 59' and the cap plate 17, the gear wheel 42 may be removed from the shaft 41 by means of a suitable tool.

The compressor 2 may consist of any suitable form and number of cylinders but as shown it is provided with a single cylinder and piston. The cylinder 60 is shown as forming a closure for the upper open end of the casing 15. The upper edge of this casing is provided with annular internal and external flanges 61 and 62, respectively. The cylinder 60 of the compressor 2 is provided on its lower end with an annular flange 63 which rests on and is secured to the flange 61 by suitable fastening means, as the bolts 65, one of which is shown in Fig. 5. A suitable gasket 66 may be interposed between the flanges 61 and 63.

The rear end of the shaft 41 is provided with a crank arm 67 which may be secured thereto in any suitable manner. As shown, the arm 67 is integral with the bearing 44. A counter-weight 68 is secured in like manner to the opposite side of the shaft. The arm 67 is provided with a bearing 69. The lower end of the piston rod 70 is journaled on the bearing 69 between a flange on the bearing and a flange carried by the retaining plug 71 secured in the recessed end of the bearing by means of the bolt 72.

The cylinder 60 is provided with a piston 73 (see Fig. 8) to which the upper end of the piston rod 70 is pivoted in any suitable manner, as at 74. The upper end of the piston is provided with an axial valve opening 75 on which the valve 76 is adapted to seat for closing the same. The valve 76 is provided with a downwardly projecting stem 77 which engages a guide 78 secured within the piston. A nut 79 on the lower end of the stem prevents its accidental withdrawal.

Attention is directed to the fact that no spring is employed to maintain the valve 76 on its seat, but that it is slidably mounted in such a manner that on the return stroke the inertia of the valve which, it will be noted, is comparatively large assists in opening the same, and hence the valve operates more efficiently than were a spring employed, because it will operate to a certain extent independently of the vapor pressure, whereas if a spring be employed the differential vapor pressure must be sufficient to overcome that portion of the combined weight of the valve and compression of the spring that is not overcome by inertia. On the other hand, on the direct stroke, the inertia of the comparatively large valve 76 will cause it to close instantly without the use of a spring, hence by this arrangement all the advantages of a spring with none of its disadvantages are obtained.

The upper end of the cylinder 60 is closed by the cylinder head 80 secured thereon by the bolts 81. The cylinder head 80 is provided with a valve opening or port 82, which opens into a recess formed by the annular projecting wall 83 on said head. A valve 84 is adapted to close the port 82. The valve has an upwardly extending stem 85 which is slidably engaged in a guide 86 carried by a cap 87 which is secured into the upper end of the annular wall 83. The valve 84 is held in lowered position by the differential vapor pressure assisted by a light spring 88. The guide 86 is provided with a projecting annular internally threaded wall 89 in which is adjustably engaged a recessed plug 90. A plunger 91 is slidably mounted in the plug 90 and is held in lowered position by means of the spring 92 the tension of which may be adjusted by means of the screw 93 which engages the upper end thereof. By adjusting the plug 90 the valve stem 85 may be made to engage the plunger 91 at any desired position in its opening movement and by adjusting the screw 93 any required compression may be placed on the spring 92. The spring 88 will permit sufficient opening of the valve to accommodate the passage of the vaporous refrigerant without affecting the upper spring, but it sometimes happens that a slug of oil is pumped through and in such an event the spring 92 tends to resiliently limit the opening movement of the valve and to quickly return it to its normal position when the oil passes through.

Mounted over and about the compressor 2 is the condenser 3. It consists of a condenser dome and coil. The condenser dome 94 is provided on its lower edge with an outwardly extending flange 95 which rests on the flange 62 on the casing 15 and is clamped between it and a ring 96 by means of the bolts 97. A gasket 97a may be employed to seal the joint. This dome may be made of any suitable material. Formerly, such devices were cast, but in such structures, leaks often develop which are extremely difficult to remedy. I have found that the dome, if drawn from sheet metal, as copper, is comparatively free from such defects and is easily soldered if a leak should develop.

The condenser coil 98 is located within the dome 94 above and about the cylinder 60 which extends upwardly within the dome. Water flowing through the condenser coil will condense the vaporous refrigerant pumped or forced into the condenser dome by the compressor 2.

The evaporator or vaporizer 4 is supported by any suitable means such as the U-shaped supports 99 which are detachably mounted on the cases 15 and 16 by means of the bolts 100. The ends of the supports extend upwardly and are detachably secured to the downwardly extending ends of saddles 101 which engage the upper surface of the header or vaporizer chamber 102. Bars 103 are supported on the saddles 101 at each side of the chamber 102. Secured to the bars 103 at each end thereof are loops 104 which engage beneath the chamber 102 at each end thereof to support the same.

The vaporizer 4 includes a vaporizer chamber, an expansion valve, and a float for controlling the same, so that a body of liquid refrigerant is maintained in the vaporizer. The chamber may also have associated with it expansion or vaporizer coils, if desired.

The front end of the vaporizer chamber 102 (see Fig. 6) is provided with an inwardly extending bead 105. A convex end member 106 of sheet metal has its peripheral portion flanged to conform to the inner periphery of the sheet metal body portion of the chamber and is inserted against the bead 105 with the convex surface extending inwardly. The forward edge 107 of the body portion of the chamber is then bent inwardly over the flange of the end member to secure the same in position. The parts may then be suitably soldered. This arrangement permits the use of a sheet metal head and at the same time provides a head that will resist a tremendous pressure without leaking or giving way.

The rear end of the chamber is provided with a head 108 having the annular peripheral groove 109 in which is secured the rear end of the cylindrical body portion of the chamber 102. The head 108 is provided with an aperture 110. The head 108 is provided with an annular groove 108a extending about the aperture 110. This groove is rectangular in cross section and has seated therein an annular gasket 108b of suitable soft material, as lead, of the same width as the groove but of slightly greater thickness than the depth of said groove. A closure 111 provided with an inwardly extending boss 110a fitting within said aperture 110 and provided also with a flange 110b overlying said gasket is adapted to be secured to said head by screws 112 which engage said flange. The clamping of the closure against the head causes the material of the gasket to flow and effectively seal the joint between the head and closure at each side of the gasket.

The closure 111 has an inwardly projecting member 113 secured thereto which is provided with an inlet opening 114, in the outer end of which is secured the upper end of the liquid refrigerant conduit 115 the lower end of which is in communication with the condenser chamber 94 through a suitable charging valve 115a (see Figs. 3 and 10) secured in the aperture 115b in communication with the port 116 in the casing 15. A strainer 117 located within the opening 114 is secured to the end of the conduit 115. The member 113 is provided with a port 118 through which liquid refrigerant is adapted to pass from the conduit 115 into the chamber 102. The port 118 is closed by the ball valve 119 which is opened by the differential pressure. A spring 120 carried by the float lever 121 holds the valve in such proximity to its seat that when the compressor is not operating the raising of the float due to the elevation of the liquid level in the chamber 102 will close the same. Moreover, the spring will prevent injury to the valve while the device is being moved or shipped. The float lever is pivoted to the member 113 at 122 and is limited in its movement by the pin 123 which engages in a notch 124 in the said lever. The lever 121 is operated by the float 125 as disclosed in my copending application, Serial No. 466,262. The liquid refrigerant containing more or less lubricant in solution therewith is formed into the chamber 102 and as the refrigerant vaporizes and is withdrawn the lubricant being lighter than the refrigerant floats thereon. The float is so constructed that it floats at the intersection of the two liquids as clearly shown in Figure 6 of the drawings.

Figure 3:
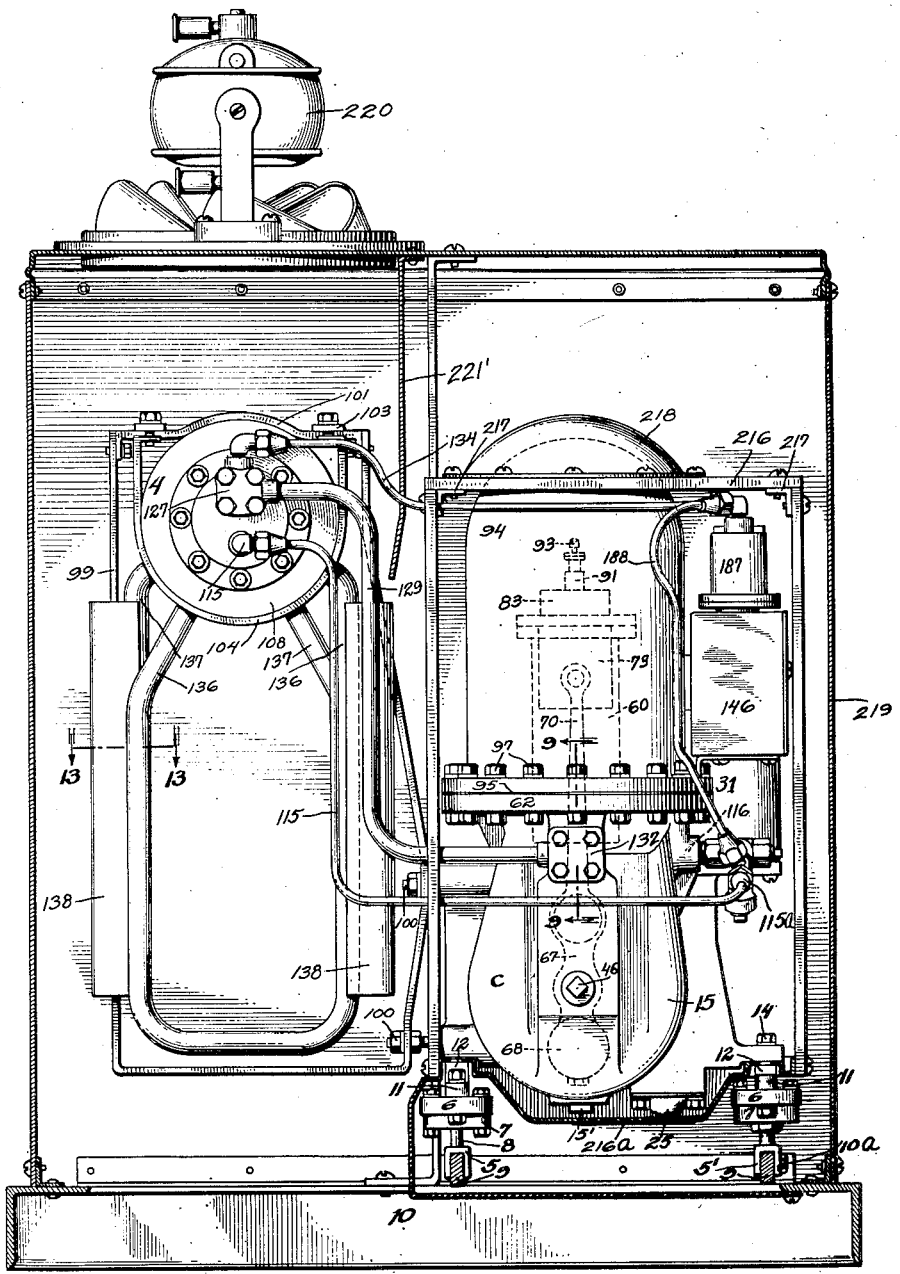
Figure 3 is a rear elevation thereof with parts in section.
Figure 4:
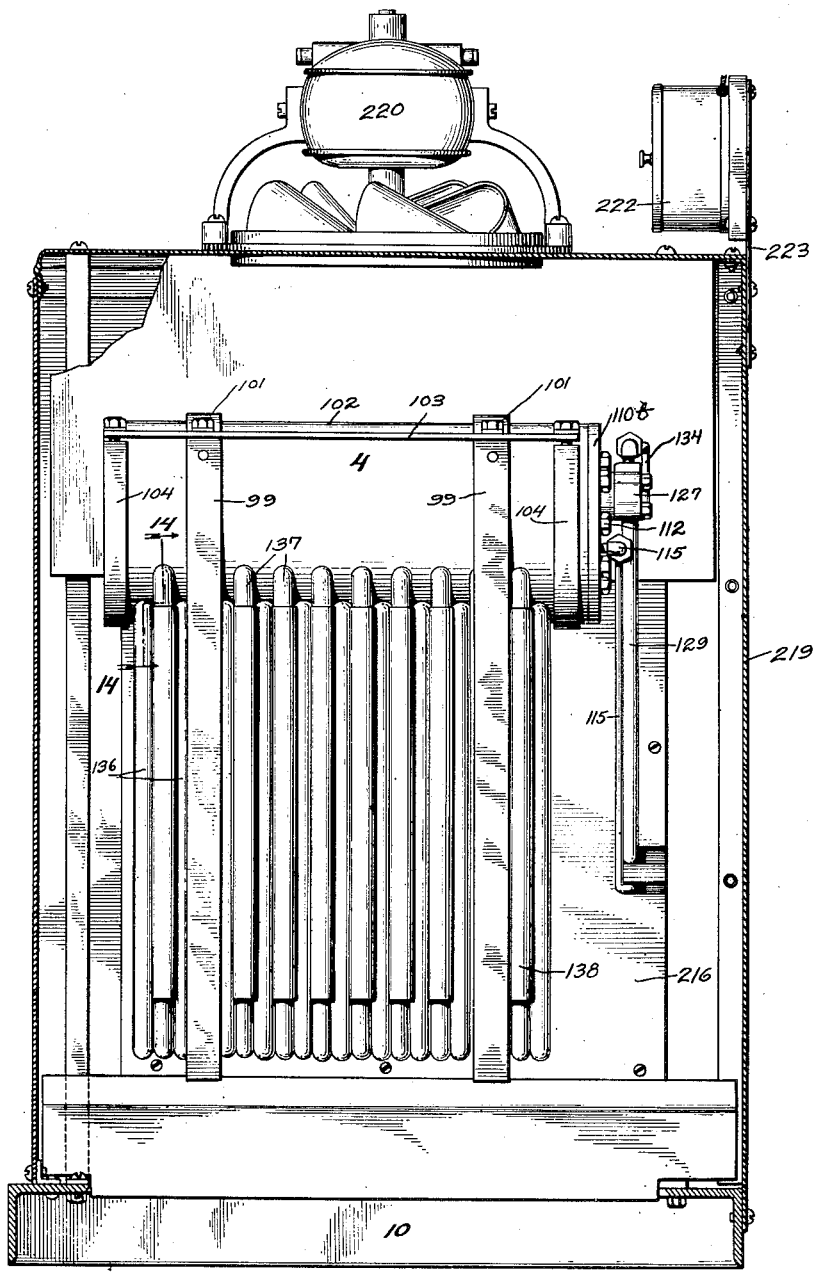
Figure 4 is a side elevation of the device showing the side opposite that shown in Figure 2, with parts in section.
Figure 6:
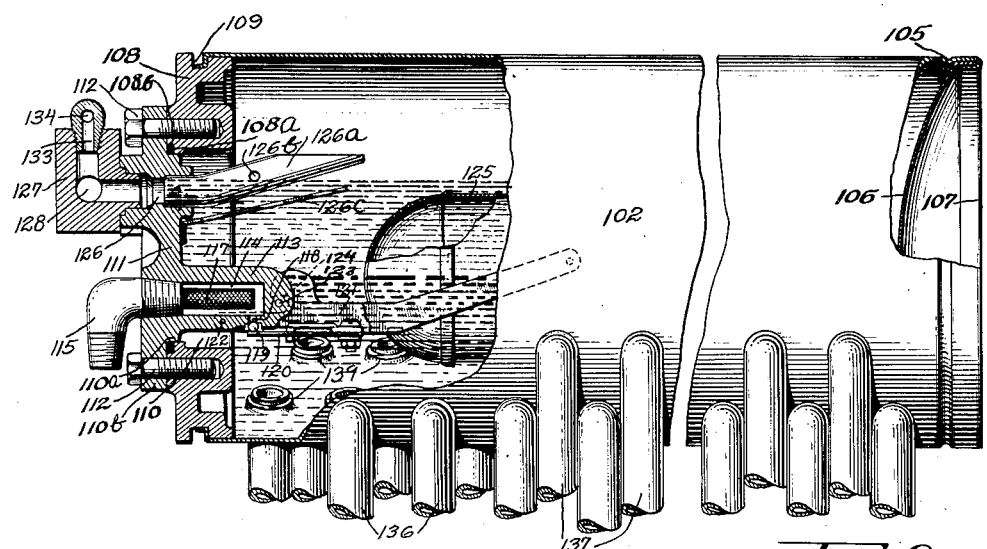
Figure 6 is a side elevation of the header or expansion tank with parts in section and parts broken away.

The closure 111 is provided with an outlet 126 (see Figs. 1, 3 and 6). A plate or block 127 is secured over the outlet 126. The block 127 is provided with a laterally extending aperture 128 in communication with the outlet 126. A conduit 129 communicating with the aperture 128 at its upper end has its lower end in communication with the port 130 in the casing 15, through the aperture 131 in the block or cap 132 secured over the port 130 in the casing 15 (see Figs. 3 and 9). The compressor draws the vaporous refrigerant into the casing 15 from the chamber 102 through this conduit 129 when the device is in operation. A tube 126a is secured in the outlet passage 126 and extends inwardly and upwardly within the chamber 102 and is provided with apertures 126b through which the oil, which is left behind by the vaporization of the refrigerant and floats on the same, overflows and finds its way back to the crank case through the conduit 129. A baffle plate 126c may be employed, if desired, to prevent liquid refrigerant being thrown into the tube 126a by the ebullition thereof. The cap or plate 127 is also provided with the aperture 133 which is in communication with the port 126. A conduit 134 has one end secured in the aperture 133 and has its other end connected to the controller or switch control mechanism 135, Fig. 7.

In order to increase the heat conducting surface of the vaporizer, one or more pipes or expansion coils may be employed. These pipes may be of any shape or form and arranged in any suitable manner in so far as some aspects of the invention are concerned. However, in the preferred construction shown, the pipes or expansion coils are arranged in two series of loops. In one series of pipes or expansion coils 136 each pipe or coil has one end secured in the bottom of the chamber 102 at the left of the center thereof, and extending downwardly laterally and upwardly is secured in the right side of the chamber. In other series of pipes or expansion coils 137, each pipe or coil has one end secured in the bottom of the chamber 102 at the right thereof, and extending downwardly laterally and upwardly is secured in the left side of the chamber. The loops are arranged in parallel planes at right angles to the chamber. The pipes are arranged in this manner in order not to unnecessarily weaken the walls of the chamber 102 and also for the reason that this arrangement forms a receptacle in which ice trays may be inserted, if desired, when the unit is employed in refrigerators. In order to further increase the heat conducting surface of the vaporizer, fins or sheet metal plates 138 may be arranged in any suitable manner, for instance, in the form of loops, as illustrated in Figs. 3 and 13 and attached, as by soldering, to the pipes 136 and 137. Obviously the vertically disposed fins 138 facilitate convection circulation of the air cooled as well as increase the heat-conducting surface of the vaporizer.

In securing the pipes 136 and 137 in the chamber 102, the wall of said chamber is punched inwardly so that the inwardly extending portion or boss 139 about each hole (see Figs. 6 and 14) will afford an extended surface to which the ends of the pipes may be soldered, this insuring permanency and rigidity of the connections. The expansion chamber 102 constitutes, in effect, a header to which the ends of the pipe loops 136, 137 are connected.

While it is possible to make the sheet metal and tubular parts of the vaporizer of various metals, I prefer to use copper because, as is well known, it is easily worked and has high thermal conductivity.

The motor for operating the device is started and stopped automatically by suitable controlling mechanism. The controlling mechanism for this purpose is pressure operated. It is the usual practice in pressure controllers to employ a fluid thermostat for automatically starting and stopping the motor. I have found, however, that the employment of a thermostat for this purpose is unnecessary because by placing the controller in direct communication with the expansion chamber, the operations of the motor may be more efficiently controlled without a fluid thermostat than with one. In the present invention the switch controlling mechanism for starting and stopping the motor is operated directly by the pressure in the expansion chamber, and since the pressure in the expansion chamber increases as the internal temperature increases and vice versa it follows that the operation of the motor is controlled by the internal temperature. This is an important feature of my invention.

Any suitable controller or switch controller mechanism may be employed. The one shown consists of a rigid cylinder 140 having an aperture 141, in its upper end in which is secured one end of the conduit 134 leading from the chamber 102. The lower flanged end 142 of the cylinder 140 is secured to the head or plate 143 having its central portion depressed to engage an opening 144 in a plate 145 seated on the top of the switch box 146. A corrugated longitudinally compressible member or bellows 147 has its lower end rigidly connected to a stationary head 148 clamped between the plate 143 and the flange 142 and having its upper end closed by the cap 149, to which it is rigidly connected. The lower side of the cap is provided with an extension having a circular recess therein to receive the upper end of a plunger 150 which is secured therein by any suitable means, such as solder. The plunger 150 extends downwardly through an aperture in the nut 151 which is screwed into an aperture in the depression in the plate 143. A saddle 152 is fitted over the reduced upper end of the nut 151. This saddle is provided with a laterally extending flange 153 on which is seated the spring 154, the upper end of which engages the flanged washer 155 loosely mounted on the plunger 150. The spring 154 tends to maintain the bellows 147 in extended position. The lower end of the nut 151 is provided with the recess 156 in which is mounted a spring 157 which surrounds the plunger 150 and is held in position by means of nuts 158. The tension of the spring 154 may be varied by adjusting the nut 151 which is secured in adjusted position by the nut 159. The tension of the spring 154 may also be varied or adjusted by means of nuts 158 which are employed to vary the tension of the spring 157, which, it will be observed, operates in opposition to the spring 154. A sleeve 157' may be employed to limit the downward movement of the plunger 150.

The pressure of the vaporous refrigerant in the expansion chamber 102 will operate through the passage 134 to depress the cap 149 and plunger 150 connected thereto. The amount of pressure necessary to operate the plunger 150 will depend upon the adjustments of the springs 154 and 157 as pointed out above.

The lower end of the plunger 150 operates the lever 160 for controlling the electric switch, in the following manner. The channel shaped lever 160 is provided with an aperture through its web portion. An inverted U-shaped member 160a is secured to the lever 160 and has an aperture in its web portion in alignment with the aperture through the lever 160. A reduced portion 150a of the plunger 150 slidably engages in the said apertures and its lower end contacts a flat spring 160b secured in the channel of the lever 160 by means of the bolt 160c. A shoulder 160d on the plunger 150 formed by the reduced portion 150a is adapted to engage the member 160a to limit the extent of the flexing of the spring 160b. A head 160e on the lower end of the stem is adapted to engage the U-shaped member 160a to elevate the lever 160 and open the switch. The lever 160 is pivoted at its intermediate portion as at 161 to a depending member 162 carried by the switch box 146. The inner end of the channel shaped lever 160 is connected by a pin and slot connection 163 to an offset portion of the arm 164, which, in turn is pivoted to the lower bifurcated end of an adjusting member 165. The upper end of the adjusting member 165 is screw-threaded and is adapted to engage a nut 166 swivelly mounted on a projection 167 on the box 146. By means of the nut 166 the adjusting member 165 may be raised or lowered to properly adjust the operating arm 164 to vary the throw thereof to centralize with the travel of the plunger 150. A lock nut 168 may be employed to hold the parts in adjusted position. A lug 169 on an intermediate portion of the arm 164 is adapted to engage the pivot 161 between the flanges of the lever 160 to limit the upward movement of said arm.

Figure 7:
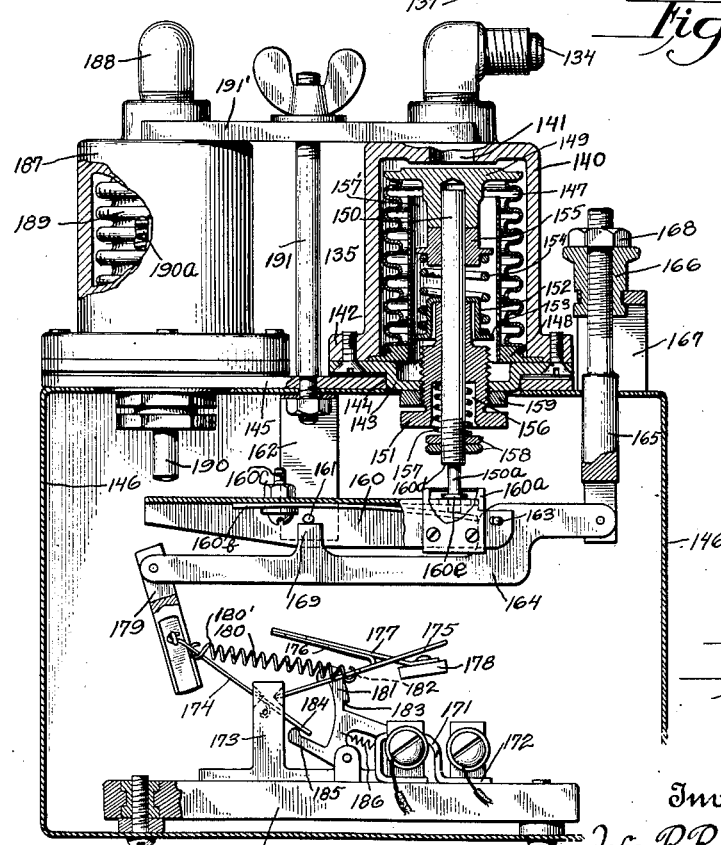
Figure 7 is a side elevation of the controller mechanism with parts in section and parts broken away.

The arm 164 is adapted to operate an electric switch of any suitable form. The one shown belongs to the "snap switch" type which is contained in the switch box 146, and consists of a base plate 170 on which is mounted the contact members 171 and 172 to which the electric leads are connected in the usual manner. A post 173 is also secured to the base plate 170 and has pivoted thereto as by knife edges the arms 174 and 175. The arm 175 is provided with a rigid extension 176 to the outer end of which are secured flat springs 177, one of which is shown in Fig. 7, carrying the contact plate 178. The springs 177 will give the contact plate 178 a slight sliding movement when it first comes in engagement with the contact members 171 and 172, which operates to maintain the contact surfaces clean. The arm 174 is secured to a link 179 which, in turn, is secured to the free end of the arm 164. Two springs 180 and 180' connect the arms 174 and 175. When the link 179 is lowered from the position shown in Figure 7, the springs will be carried below the pivotal points of these arms, and will, when they pass dead center, snap the contact plate 178 into engagement with the contact members 171 and 172. When the link 179 is elevated, the reverse operation takes place. The arm 175 is limited in its upward movement by means of a latch 181 which engages the forward edge of the slot 182 in the arm 175. When the arm 175 is in lowered position, the rear edge of the slot is engaged by a notch 183 carried by the latch. When the contact member 178 is in lowered position, it is held in such position by means of the notch 183 until the extension 184 of the arm 174 engages a toe-piece 185 on the latch 181 and releases the same against the tension of the spring 186, thus permitting the springs 180 and 180' to snap the contact plate 178 away from the contact members 171 and 172.

In the operation of the device, assuming that the parts are in the position shown in Fig. 7, the plunger 150 will be forced downward as the pressure in the chamber 102 increases due to a rise in the temperature. The descent of the plunger against the spring 106b will cause the lever 160 to move downward thus causing a downward movement of the arm 164 to throw the switch and start the motor.

It sometimes happens in mechanical refrigerators of the compression type that the pressure in the condenser becomes excessive, as for instance, when the supply of cooling medium is stopped for any reason. It is necessary to provide means for stopping the motor under such conditions. Any suitable mechanism may be employed. In the form shown more or less diagrammatically in Figure 7, a device is provided which in all essential details is substantially the same as that just described. The cylinder 187 has attached thereto a conduit 188, which is in communication with the high pressure side of the condenser. As shown, the conduit 188 is in communication with the conduit 115. A corrugated, longitudinally, compressible member or bellows 189 similar to the corresponding member 147 is adapted to be compressed by the pressure of the liquid refrigerant in the passage 188. The plunger 190 is secured to the upper end of the bellows in the same manner as the corresponding plunger 150. A spring 190a within the bellows 189 tends to maintain the plunger 190 in elevated position. When the pressure on the upper end of the bellows 189 becomes excessive the plunger 190 will move downwardly against the compression of the spring and will come in contact with the free end of the lever 160, which, in turn, will elevate the arm 164, the spring 160b permitting such movement. As the arm 164 moves upward it carries the link 179 upward to thus open the switch and stop the motor. The cylinders 140 and 187 are secured in position on the switch box 146 by means of a bolt 191 secured to the switch box. This bolt passes through a yoke 191' which engages the upper ends of the said cylinders.

In refrigerators of the compression type, it is necessary to employ a cooling fluid, usually water, to absorb and conduct away the heat of the compressed refrigerant vapor in order to condense the same. In automatically operated refrigerators a valve for admitting the water to the condensing coil is opened and closed by a device that is usually automatically operated by the pressure created when the compressor is operated. With such a control, however, in order that the water valve may be opened only during the operation of the motor, the minimum pressure at which the control must be set to open the valve is that corresponding to the highest temperature of the room during the hottest season of the year. Consequently, the compressor must always operate against this high pressure which very materially decreases its efficiency and increases its cost of operation.

In order to overcome the necessity of the compressor operating against this excessive pressure, I have provided mechanism for operating the water valve simultaneously with the starting and stopping of the motor. By such an arrangement, the pressure in the condenser is never much above that corresponding to the temperature of the cooling fluid which, under ordinary working conditions, is very much less than in the former system. In other words, the compressor will operate at a pressure which, while varying with the temperature of the cooling fluid, will always be materially less than under the pressure control system. This mechanism indicated at 192, consists of a base plate 192a, which is adapted to be secured to the top of the casing 16 as shown in Fig. 1. Two spaced metallic supporting strips 193 are mounted on the base plate 192a and extend upwardly therefrom. A valve containing member 194, Fig. 12, is clamped between the upper ends of the supporting plates 193. The valve supporting member 194 is provided with an axial bore 195 having the restricted portion 196 which forms a seat for the ball valve 197. A water conduit 198 has one end connected in the bore 195 and has its other end connected to the flexible connection 199 (see Figs. 1 and 2) which in turn, is connected to the water supply pipe. The bore 195 has a lateral passage in which is connected one end of the pipe 200, the other end of which is connected to one end of the condensing coil 98. The other end of the condensing coil is connected to the pipe 201 which is in communication with the sewer. A plug 202 is slidably fitted in the lower end of the bore 195. The plug is provided with packing 203 to make the joint water-proof. The lower end of the plug 202 is provided with a shoulder 204 against which is seated one end of the spring 205, the other end of which is in engagement with the valve member 194. The plug 202 is provided with an axial opening in which is rigidly mounted the valve operating rod 206. The valve operating rod 206 is adapted to unseat the valve 197 and permit the entrance of water from the main through the conduit 198 and pipe 200 into the condenser. The rod is operated by the mechanism that will now be described.

A laminated horse-shoe electro-magnet 207 has its inner leg clamped between the supporting strips 193 and is provided at its lower end with a shading coil 193' in the usual manner to prevent humming when an alternating current is employed. The outer leg is provided with the winding 208 which may be in series with the motor. The lower end of the outer leg is provided with extensions 209 to which is pivotally connected one end of the armature 210. The free end of the armature 210 is provided with an extension 211 which is provided with an enlarged aperture 212 at its free end. A contact member 213 extends through the aperture 212 and is provided with adjusting nuts 214 above and below said extension. When the circuit is closed the current will energize the winding 208 which, in turn, will magnetize the member 207. When the member 207 is magnetized, it will attract the armature 210 which in turn, will elevate the valve operating rod 206 and plug 202 against the tension of the spring 205 to open the valve 197. A screw 215 limits the upward movement of the valve 197 and maintains the same in proximity to its seat. A stop 215a limits the downward movement of the armature 210.

In preparing the compressor-condensor-vaporizer apparatus for operation a suitable amount of lubricant is charged into the crank case 15 of the compressor and into the gear case 16. When sulphur dioxide is used as the refrigerant, I prefer to use as a lubricant a mineral oil having substantially the following characteristics: Viscosity, low; specific gravity .985 to .890; cold test, below 0° F.; flash point, about 350° F.; surface tension, high; moisture, as low as commercial standards permit. Also, the oil should be free from saponifiable matter and acids and low in unsaturated compounds. A lubricating oil with these characteristics is rather highly soluble in sulphur dioxide.

A sufficient amount of the lubricant may be placed in each of the cases 15, 16 to seal the two ends of the packing gland 47, 48 of the operating shaft 41. Then, especially if sulphur dioxide is employed as the refrigerant, the interior spaces of the compressor, condenser, vaporizer and their connecting conduits are very thoroughly dried and exhausted in order to remove all moisture. The desired amount of refrigerant gas is then charged into the system through the valve 115a. With my self-contained unit this can be done in the factory before the apparatus is shipped for installation. The charged unit having been placed in the compartment to be cooled and the electrical connections having been made and the condenser connected with the water supply and waste pipes, the apparatus is ready for operation.

In the operation of the refrigerant system, a rise of the pressure of the vaporous refrigerant in the header 102 is transmitted through the conduit 134 to the switch operating cylinder 140 and the motor switch is closed, thus starting the operation of the compressor and the flow of the condenser water. By the operation of the compressor the expanded refrigerant is drawn from the upper part of the header 102 through the conduit 128, compressed, liquefied in the condenser and fed by the float-controlled expansion valve 119 into the header so as to maintain a predetermined body of liquid refrigerant in the header and the coils 136, 137 of the vaporizer. A rapid expansion and vaporization of a portion of the liquid refrigerant occurs as it passes the expansion valve 119 and throughout the vaporizer there is more or less continuous and gradual evaporation of the refrigerant as heat is absorbed by the header and the coils 136, 137 from the surrounding air. By disposing the expansion valve within the header, full advantage is taken of the cooling effect of the sudden vaporization of the refrigerant as it passes said valve.

The operation of the compressor results in a more rapid vaporization of the refrigerant with resultant cooling of the body of liquid and vaporous refrigerant in the vaporizer, as well as of the surrounding atmosphere. The fall in the internal temperature of the vaporizer lowers the vapor pressure therein and the spring 154 in the switch operating cylinder 140 acts to open the motor switch, thus stopping the compressor and closing the condenser water valve. In addition to the pressure effect of the falling internal temperature of the vaporizer, it will be seen that the suction of the vaporous refrigerant from the vaporizer by the compressor tends to have the same pressure reducing effect as the lowering of the temperature, and consequently the operation of the switch by pressure drawn from the interior of the vaporizer takes advantage of both effects and the resultant control of the compressor is better adapted to meet the varying conditions of operation than are the purely thermostatic controls of prior systems in which the operation of the compressor is determined by the temperature of the room. In addition, there is a peculiar advantage in applicant's system of control incident to the use of the pressure of the vapor of a flooded type vaporizer. In such a vaporizer there is always present a body of liquid refrigerant and consequently the vapor in the vapor space of such a vaporizer is always saturated. By using the pressure of this saturated vapor for actuating the motor switch, the operation of the compressor responds with uniform accuracy to the true internal temperature-pressure condition of the vaporizer, and a more reliable and efficient operation of the refrigerant system is secured. Furthermore, with my system of controlling the cooling water, the compressor is not called upon to operate against as high discharge pressures as in other systems, as has been explained above. It will be understood that the vaporizer pressures at which the compressor is started and stopped are determined by adjustment of springs 154, 157 to maintain the desired temperature of the room.

Ordinarily the switch operating cylinder 140 takes care of the operation of the system, but under abnormal conditions, the failure of the cooling water supply for example, if the discharge pressure of the compressor rises unduly the switch operating cylinder 187 becomes effective to open the motor switch and stop the compressor.

As previously noted the lubricant in the crank case of the compressor works past the piston and is discharged from the compressor cylinder into the condenser where more or less of it is dissolved in the liquefied refrigerant and passed thence with the refrigerant into the vaporizer. Here, the lubricant, being lighter, rises to the top of the liquid refrigerant as indicated in Fig. 5. As soon as the lubricant rises to the level of the openings 126b it begins to drain through said openings into the conduit 128 which conducts it back to the crank case of the compressor. The float 125, formed as to weight and size as previously described, serves to maintain the level of the liquefied refrigerant in the header substantially constant and, in conjunction with the drain openings 126b, also serves to maintain a substantially uniform body of lubricant in the header, the remainder of the lubricant being in the crank case or in circulation through the closed system. A continuous lubrication of the working parts is thus insured and the automatic circulation of the lubricant is effected without the use of additional working parts, the float 125 being otherwise necessary to control the expansion valve.

In order to prevent the noise made by the operating parts of the refrigerator from being heard and to prevent undue heat transfer, the operating parts, that is the motor, compressor, controls and valve operating mechanisms are isolated from the vaporizer by means of a housing 216, Figs. 1 to 5.

This housing may be made of any suitable material, preferably of insulating material, and the walls are connected together in any suitable manner as by means of the brackets 217. The bottom wall of this housing is formed from sheet metal bent to proper form to constitute an oil receptacle or pan 216a (see Fig. 3). In order to conserve material, the top wall of the housing may be provided with an aperture through which the upper portion of the dome may extend. This aperture is closed by a plate 218.

The refrigerating unit is preferably enclosed in a sheet metal casing 219. This casing may be made and put together in any suitable manner as by means of bolts so that one or more side walls may be readily removed to have access to the device. The casing may be bolted to the supporting frame 10. The bottom of this casing directly beneath the vaporizer is left open when the parts are assembled, the whole device being portable. It will also be appreciated that the cooling unit may be readily removed from the casing 219 when necessary or desirable.

In order that the atmosphere in all parts of the cooling room shall be maintained at a uniform constant temperature, a fan for agitating and circulating the air is provided. This fan is so arranged that it directs the air across the vaporizer whereby the air is cooled. It is not necessary, however, that the fan be run continuously in order to maintain the room at a predetermined temperature. A thermostat is provided for automatically starting and stopping the fan in order to maintain the room at the required temperature.

As shown in Fig. 1, the electric fan 220 is mounted on the casing 219 directly above the opening 221 (see Fig. 5) in the top wall of the casing 219 in any suitable manner. A deflector 221', Fig. 1, directs the air across the vaporizer.

Thermally operated means are employed to control the operation of the fan. As shown, a thermostat 222 is mounted in any convenient manner either on the casing 219 or at any convenient point within the enclosure in which the unit is employed. As shown in Fig. 1, a plate 223 is attached to one side wall of the casing and extends above the same to which is attached the thermostat. The thermostat is arranged to open and close the switch for operating the electric fan. The thermostat may be adjusted in the usual manner to operate at any desirable predetermined temperatures. Since the details of the thermostat constitute no part of my invention, those details are not herein described.

In the use of my improved apparatus as an air-cooling unit, the air of the enclosure to be cooled is usually maintained at a temperature above the freezing point of water and consequently when the air is circulated by the fan and comes in contact with the colder surfaces of the refrigerant vaporizer, moisture present in the air is condensed on the surfaces of the vaporizer and there frozen; or, as it is usually expressed, the vaporizer becomes frosted. The frost or ice may thus form on the vaporizer to a considerable depth. However, as the springs 154, 157 of the switch operating device are constructed and adjusted so that the switch is opened at a substantially higher internal temperature of the vaporizer than the temperature at which it is closed, when the switch has been opened and as the fan continues to circulate the air over the vaporizer the latter is defrosted because the temperature of the air is above the freezing point of water and the vaporizer is abstracting less heat from the air while the compressor is not operating and the internal temperature of the vaporizer is gradually rising. The water formed by the melting frost or ice may be collected in a pan or receptacle from which it may be conducted to the sewer if it is desired to maintain the air in the enclosure dry.

If, however, it is desirable that a normal amount of moisture be maintained in the air to prevent the drying out of certain foods, such as meats or the like, the water is left in the receptacle to be reabsorbed by the air.

In connection with the frosting and defosting action above referred to, a peculiar advantage resides in the nature of the automatic control provided for the operation of the refrigerant compressor and the fan motor, respectively. In my system, the fluid pressure actuating device for operating the switch of the compressor motor is responsive to changes of temperature of the means for absorbing heat from the air to be cooled. In the preferred construction illustrated this heat-absorbing means consists, of course, of the vaporizer, with the walls of which the air comes in direct contact, and the switch-actuating device is responsive to the temperature not merely of the vaporizer structure but also and primarily of the refrigerant vapor in the vaporizer. This system of compressor control is peculiarly advantageous in connection with the cooling of the air because when the heat-absorbing device becomes frosted, as above described, the frost or ice coating is a very poor conductor of heat so that if, for example, the compressor control devices were made responsive to the air surrounding the heat-absorbing means, the compressor might continue operating very much longer than should be necessary and at a lower vapor temperature than characterizes the operation of my apparatus under similar circumstances. Such operation at lower internal temperature would greatly reduce the efficiency and the capacity of the compressor mechanism as it results in a handling of a smaller mass of refrigerant vapor. With my system of control, on the other hand, the operation of the compressor responds directly and accurately to changes of temperature of the vaporizer itself so that the average refrigerant vapor temperature approaches more nearly the temperature of the air to be cooled and the refrigeration apparatus operates with a maximum efficiency and at the same time the separately controlled motor of the air circulating fan insures a circulation of the air requisite to maintain the desired temperature in the space to be cooled.

The form of the device shown in Fig. 16 is substantially the same as that shown in Figs. 1 to 5 except for a different arrangement of the fan and a different form and arrangement of the heat conducting fins. In the form of the device shown in this figure the fan 220 is mounted in an opening in the rear wall of the casing 219 directly in rear of the vaporizer 4 whereby it may direct a current of air along, through and about the vaporizer coils.

In order to increase the heat conducting surface of the vaporizer, heat conducting members of any suitable form may be attached to the vaporizer in any convenient manner. As shown in Figs. 16 and 17, each U-shaped coil may be provided with a heat conducting plate 224 extending from one side of the coil to the other and provided with fins. The heat conducting plates 224 may each be made from a plate of sheet metal, by first slitting the same as at 225 to form the fins 226, then bending the fins at right angles to the main body portion of the plate as clearly shown in Fig. 17. By arranging the fins edgewise to the direction of the current they will offer a minimum amount of resistance to the passage of air through the vaporizer coils. As in the case of the first described form of vaporizer, the sheet metal and tubular parts of this last described form of vaporizer are preferably made of copper.

The form of the device shown in Fig. 16 is more economically and easily manufactured than the form shown in Figs. 1 to 5, because the fins are more easily made and applied. But it will depend on various conditions and circumstances which form of the device is better suited for use in any particular enclosure, such as the size and shape of the enclosure and the nature or character of the work to be done. For instance, where the device is employed in a cooling room designed for ice, the form of the device shown in Fig. 16 may be employed without making any change whatever in the room, except to provide water and electrical connections. It is only necessary to place the cooling unit on the floor of the ice compartment and make the necessary electrical and water connections. Such an arrangement is shown in Fig. 19.

In Fig. 19 is shown a usual or conventional cooling room employed in stores, shops and the like. The cooling room D is provided with the lower compartment E in which meat or other articles may be placed or suspended from the hooks 227, and the upper compartment F in which the ice is placed. The upper compartment is provided with a floor 228 which is narrower than the width of the room and is so located that there is a ventilating space between each side wall and the floor. A narrow vertical wall 229 rises from one edge of the floor and when ice is employed causes the natural circulation of air across the ice in the direction of the arrows, warmer air ascending on that side and the cooler air descending on the other.

In the application of my invention to the conventional ice refrigerator described above, in order to conserve space in the lower compartment, one or more cooling units may be placed in the ice compartment. As shown on the drawings, three units $A^1$, $A^2$, $A^3$, of the form shown in Fig. 16 are employed. They may be set on the floor 228 and are arranged with the fans adjacent to the wall 229 so that the circulation of the air will be in the same direction as when ice is employed. A single thermostat 222 for controlling the fans is secured to the cooling room wall in such a position that it is directly in front of one of the fans whereby it is more readily affected by the lowered temperature of the air forced across the vaporizer.

Any suitable form of wiring may be employed. In Fig. 20 is shown a preferred wiring diagram for a plurality of units showing a separate fuse for each fan and each motor whereby each fan and each motor operates independently of the others. By this arrangement, should one unit get out of order it will not affect the operation of the others. Since the circuits of the three units are similar only one need be traced. The fan circuit for the unit $A^1$ may be traced as follows. The current enters through lead 230, fuse 231, passes through the fuse 232, switch 233 and conductor 234 to the fan 220, thence through the conductor 235 to the thermostat 222. From the thermostat the current passes through the return wire 236, switch 233, fuse 232' and back to the lead 237.

The motor circuit for the same unit is traced as follows: the current enters through the lead 230 as before through the switch 238, and suitable fuses, thence through the conductor 239 to the water valve 192, thence through the controller switch 146 to the motor and back to the lead 237 through the conductor 240, switch 238 and proper fuses.

It will be noted that the compressor motor and the water valve magnet are connected in series in the same circuit and this arrangement possesses marked advantages of simplicity of construction and reliability of operation. It will, of course, be understood that the winding of the water valve magnet must take account of the current demands of the compressor motor.

In Fig. 21 is shown a section of a cooling room that is designed for mechanical coolers. It is similar to the room shown in Fig. 19 with the ice supporting floor 228 removed. One or more cooling units may be secured to one of the side walls 241 in any convenient manner. As shown on the drawings a bracket 242 is secured in an elevated position to one of the side walls 241, and a cooling unit is supported thereon. While the unit here shown has the fan supported on top of the same it is understood that the type shown in Fig. 16 may be employed, if desired. A pan or receptacle 243 is supported beneath the unit in any suitable manner as by the bracket or shelf 244. The receptacle 243 has a pipe 245 connected thereto. When the vaporizer is defrosted the water collects in the receptacle. If it is desirable to maintain the air in the cooling room extremely dry the valve or turn-cock 246 is left open and the water as it collects in the pan is discharged into the waste pipe 245. If, however, it is not desirable to remove the moisture from the air, the valve 246 is closed and the water collected in the receptacle will be reabsorbed by the air. The absorption is greatly facilitated by directing the air current on or over the water contained in said receptacle, as shown in Figure 21.

In Fig. 22 is shown a household refrigerator having a cooling unit associated therewith. The refrigerator cabinet 246' may be of any construction. The one shown in Fig. 22 consists of a lower food compartment 247 and an upper compartment 248. The door 249 of the upper compartment is shown as being open in order to show the cooling unit located therein. The partition wall 249' between the two compartments is provided with two ventilating openings 250 and 251 for the natural circulation of the air within said refrigerator. The opening 251 is located directly beneath the vaporizer. It will be noted that no fan is employed, the natural circulation of the air being quite sufficient.

A metallic supporting member 252 is secured within the loops of the expansion coils 136 and 137 and is provided with openings 253 for the reception of trays 254. One of the openings 253 with the tray removed is shown on the drawings. These trays are adapted to contain water or other articles that are to be chilled or frozen.

It has been found that with this arrangement of the vaporizer and its expansion coils, water or other substances in the trays may be frozen without the necessity of employing a liquid heat conveying medium, such as brine, in connection with the vaporizer or its expansion coils.

The bifurcated flexible supports 5 and 5' are adapted to engage guides 255, similar to the guides 9, secured within the upper compartment.

In Fig. 23 is shown a modified form of support for the cooling unit and a guide therefor.

The lower ends of the supports, one only of which is shown in Fig. 23, are provided with balls 256 which are adapted to engage in tubes 257 having slots 258 on their upper sides to permit the sliding of the supports along said guides.

This invention is not limited in its application to the particular construction or constructions herein illustrated, as various changes might be made in the construction or constructions shown without departing from the spirit of this invention as set forth in the appended claims.

I claim:

1. In refrigeration apparatus, the combination of a refrigerant compressor, a water cooled condenser to receive the compressed refrigerant, a vaporizer connected with the condenser and with the suction side of the compressor, an electric motor to drive the compressor, an electro-magnetically actuated valve to control the flow of cooling water through the condenser, the windings of said valve and motor being connected in series, a switch in the electric circuit through the motor and the valve magnet for opening and closing said circuit, and means for operating said switch comprising a fluid pressure actuated device responsive to changes of the pressure characteristics of the vaporizer.

2. In refrigeration apparatus, the combination of a refrigerant compressor, a water cooled condenser to receive the compressed refrigerant, a vaporizer connected with the condenser and with the suction side of the compressor, an electric motor to drive the compressor, an electro-magnetically actuated valve to control the flow of cooling water through the condenser, the windings of said valve and motor being connected in series, a switch in the electric circuit through the motor and the valve magnet for opening and closing said circuit, and means for operating said switch comprising a fluid-pressure actuated device connected with the vapor space of said vaporizer and responsive to changes of vapor pressure therein.

3. In refrigeration apparatus, the combination of a refrigerant compressor, a water-cooled condenser to receive the compressed refrigerant, a vaporizer connected with the condenser and with the suction side of the compressor, means operable in conjunction with the compressor and condenser to maintain a body of liquid refrigerant in the vaporizer, an electric motor to drive the compressor, an electro-magnetically actuated valve to control the flow of cooling water through the condenser, the said motor and valve magnet being electrically connected in series, a switch in the electric circuit through the motor and the valve magnet for opening and closing said circuit, and means for operating said switch comprising a fluid pressure actuated device connected with the vapor space of said vaporizer and responsive to changes of vapor pressure therein.

4. In refrigeration apparatus, the combination with a closed refrigerant system comprising a compressor, a water-cooled condenser and a vaporizer, of an electric motor to drive the compressor, an electro-magnetically actuated valve to control the flow of cooling water through the condenser, the said motor and valve magnet being connected in series, a switch in the electric circuit through the motor and the valve magnet for opening and closing said circuit, means for operating said switch comprising a fluid-pressure actuated device connected thereto and responsive to changes of the vapor pressure in the vaporizer, and additional motor control means comprising a fluid-pressure actuating device responsive to changes of pressure in the high pressure side of said closed system and adapted to open the electric circuit through the motor when said pressure exceeds a predetermined value.

5. In refrigeration apparatus, the combination with a closed refrigerant system comprising a compressor, a water-cooled condenser and vaporizer, of an electric motor to drive the compressor, an electro-magnetically actuated valve to control the flow of cooling water through the condenser, the said motor and valve magnet being connected in series, a switch in the electric circuit through the motor and the valve magnet for opening and closing said circuit, means for operating said switch comprising a fluid-pressure actuated device connected thereto and responsive to changes of the vapor pressure in the vaporizer, and additional motor control means comprising a fluid-pressure actuating device responsive to changes of pressure in the high pressure side of said closed system and adapted to open the said switch when said pressure exceeds a predetermined value.

6. In air cooling apparatus, the combination of means comprising a refrigerant vaporizer for absorbing heat from the air to be cooled, a refrigerant compressor, a condenser, said compressor, condenser and vaporizer being operatively connected to form a closed refrigerant system, a motor for driving the compressor, means directly responsive to the vapor pressure within the said heat-absorbing means for controlling the operation of the compressor motor, means comprising a fan for directing the air to be cooled over the said heat-absorbing means, a motor for driving said fan, and means responsive to the temperature of the air to be cooled for controlling the operation of the fan motor.

7. In air cooling apparatus, the combination of means comprising a refrigerant vaporizer for absorbing heat from the air to be cooled, a refrigerant compressor, a condenser, said compressor, condenser and vaporizer being operatively connected to form a closed refrigerant system, a motor for driving the compressor, means directly responsive to the vapor pressure within the refrigerant vapor in the said vaporizer for controlling the operation of the compressor motor, means comprising a fan for directing the air to be cooled over the said heat-absorbing means, a motor for driving said fan, and means responsive to the temperature of the air to be cooled for controlling the operation of the fan motor.

8. An air cooling apparatus constituting a self-contained unit and having in combination means comprising a refrigerant vaporizer for absorbing heat from the air to be cooled, a refrigerant compressor, a condenser, said compressor, condenser and vaporizer being operatively connected to form a closed refrigerant system, a motor for driving the compressor, means directly responsive to the vapor pressure within the said heat-absorbing means for controlling the operation of the compressor motor, a casing around said heat-absorbing means, a fan for causing flow of the air to be cooled through said casing, a motor for driving said fan, and means responsive to the temperature of the air to be cooled for controlling the operation of the fan motor.

9. In refrigeration apparatus, the combination of a compressor, a condenser, a vaporizer, a motor, power transmission gearing interposed between the motor and the compressor, a housing enclosing said gearing and a supporting frame for the vaporizer supported by the said gear housing.

10. In combination with a refrigerating unit, a refrigerating evaporating duct connected therewith adapted to be freely suspended in a body of air to be cooled, a vertically disposed cuprous heat absorbing plate disposed close and substantially parallel to said duct and in intimate thermal contact with said duct at a plurality of points along its length, whereby the heat absorption property of said duct is increased.

11. In combination with a refrigerating unit, a refrigerant evaporating duct connected therewith and arranged to facilitate a free downward circulation of air past it, a relatively wide and vertically disposed metal heat absorbing fin arranged parallel with and soldered to said duct to accentuate downward convection currents of the surrounding air, the absorption of heat therefrom and to increase evaporation of the refrigerant in the portion of said duct thermally united with said heat absorbing fin.

12. A refrigerating system comprising refrigerant condensing and evaporating units having high and low pressure sides, a pair of unobstructed ducts providing open communication between corresponding sides of said condensing and evaporating units, means on the low pressure side of the system for maintaining the evaporating unit uniformly flooded with refrigerant liquid, and means directly responsive to the variation in pressure in the low side of the system for controlling the operation of the refrigerant condensing unit.

In testimony whereof I affix my signature.

JOHN R. REPLOGLE.